United States Patent [19]

Lin

[11] Patent Number: 5,446,771

[45] Date of Patent: Aug. 29, 1995

[54] ADAPTIVE COHERENT SIGNAL DETECTION METHOD AND APPARATUS

[75] Inventor: Jingdong Lin, Norwood, Mass.

[73] Assignee: Motorola, Inc., Schaumburg, Ill.

[21] Appl. No.: 185,619

[22] Filed: Jan. 24, 1994

[51] Int. Cl.6 ............................................. H04B 3/46
[52] U.S. Cl. ............................... 375/224; 375/222; 375/320; 375/325; 375/377; 327/7; 327/42; 327/46; 327/47; 379/93; 329/363
[58] Field of Search .................. 375/7, 8, 10, 94, 80, 375/121, 219, 222, 224, 324, 325, 340, 377; 379/93, 97, 98; 370/17, 24, 31; 329/347, 363; 307/231, 510, 511, 522, 523, 525; 327/7, 42, 47, 46

[56] References Cited

U.S. PATENT DOCUMENTS

| | | | |
|---|---|---|---|
| 4,931,250 | 6/1990 | Grezczuk | 375/8 |
| 5,202,905 | 4/1993 | Sakamoto et al. | 375/8 |
| 5,287,540 | 2/1994 | Kuusinen | 375/94 |
| 5,311,578 | 5/1994 | Bremer et al. | 375/8 |
| 5,331,666 | 7/1994 | Dent | 375/94 |
| 5,349,635 | 9/1994 | Scott | 375/8 |

Primary Examiner—Stephen Chin
Assistant Examiner—Amanda T. Le
Attorney, Agent, or Firm—Darleen J. Stockley

[57] ABSTRACT

A detector (100) determines whether an input signal (10) comprises a first signal or a second signal. A first local signal (207) is generated based on the first signal and a second local signal (307) is generated based on the second signal. A first error (211) is formed based on the first local signal and a scaled input signal (50), and a second error (311) is formed based on the second local signal and the scaled input signal. A first distance (215) between the scaled input signal and the first local signal is formed based on the first error, while a second distance (315) between the scaled input signal and the second local signal is formed based on the second error. Whether the input signal comprises the first signal or the second signal is determined by comparing (60) the first distance to the second distance.

20 Claims, 1 Drawing Sheet

ADAPTIVE COHERENT SIGNAL DETECTION METHOD AND APPARATUS

FIELD OF THE INVENTION

This application relates to signal detection including, but not limited to, an adaptive coherent signal detection method and apparatus.

BACKGROUND OF THE INVENTION

In the start-up phase of v.34 modems, the calling modem is required to identify the type of answer modem, which can be either a v.32 modem, or a v.34 modem. The calling modem performs the identification via detecting the type of answer signal (hereinafter "v.id signal") sent by the answer modem. If the answer modem is a v.32-type, a 2100 Hz signal (hereinafter "ANS") will be sent. In contrast, if the answer modem is a v.34-type, an amplitude-modulated 2100 Hz signal (hereinafter "ANSam") will be sent. For the latter case, the modulating signal is a 15 Hz signal, and the modulation index is 20%.

The task of the v.id detector, therefore, is to determine whether the answer signal comprises an ANS-type signal or an ANSam-type signal. This problem is further complicated by the fact that typically the answer signal is received over a noisy channel. On such channels, the signal to noise ratio may be as low as 6 dB. In such an environment, it has been found that conventional notch-filter type detectors do not work reliably. This is due to the low-frequency (15 Hz compared with 2100 Hz) and low-energy (20% modulation index) nature of the 15-Hz modulating signal of the ANSam signal. This is further due to the high noise on such channels.

As a result, there is a need for an adaptive coherent signal detection method and apparatus suitable for detecting the v.id signal.

DESCRIPTION OF THE PREFERRED EMBODIMENT

Figure 1:
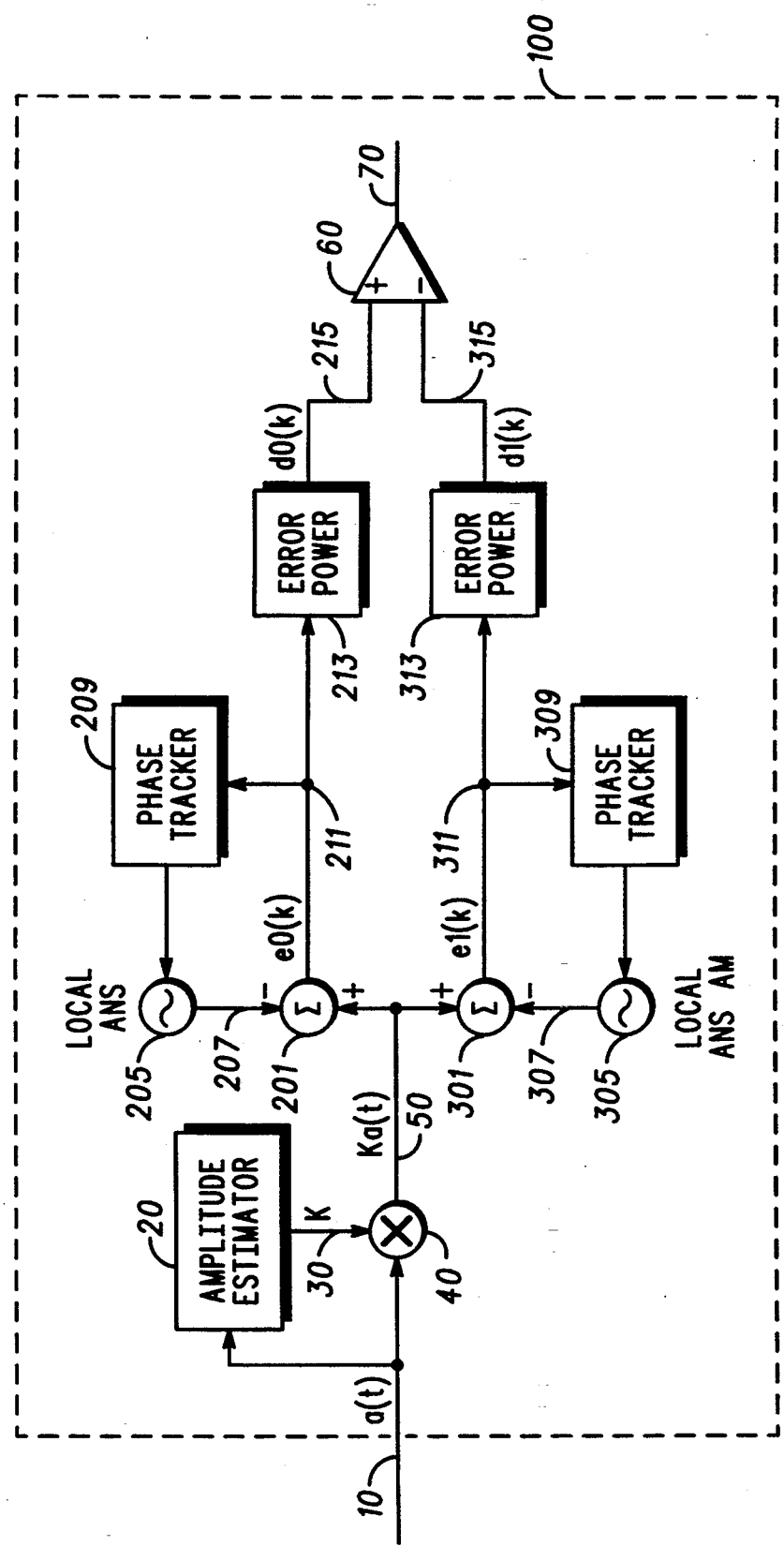
FIG. 1 depicts a first embodiment of an adaptive coherent signal detection apparatus 100, in accordance with the present invention. The apparatus depicted in FIG. 1 is also suitable for demonstrating a first embodiment of an adaptive coherent signal detection method, in accordance with the present invention.

Briefly, there is disclosed a method and apparatus for determining whether an input signal comprises a first signal, to wit, the above "ANS" signal comprising a 2100-Hz signal, or a second signal, to wit, the above "ANSam" signal comprising a 2100-Hz signal amplitude-modulated by a 15-Hz signal. A first local signal is generated based on the first signal and a second local signal is generated based on the second signal. A first error is formed based on the first local signal and a scaled input signal, and a second error is formed based on the second local signal and the scaled input signal. A first distance between the scaled input signal and the first local signal is formed based on the first error, while a second distance between the scaled input signal and the second local signal is formed based on the second error. Whether the input signal comprises the first signal or the second signal is determined by comparing the first distance to the second distance.

Referring now to FIG. 1, an answer signal a(t) 10 is input to an amplitude estimator 20, where the power of the answer signal is estimated, and a level-adjusting scaling factor K, reference number 30, is calculated. A multiplier 40 then scales the answer signal 10 by the scaling factor 30, thus forming a scaled answer signal Ka(t) 50 at the desired input level.

A first generator 205 generates a first local signal designated "local ANS" (reference number 207) to emulate the first possible type of answer signal, namely, the ANS-type. The local ANS signal 207 thus comprises a 2100-Hz signal. Further, a first summing junction 201 then subtracts the local ANS signal 207 from the scaled answer signal 50, thus forming a first error signal e0(k), reference number 211.

As well, a second generator 305 generates a second local signal designated "local ANSam" (reference number 307) to emulate the second possible type of answer signal, namely, the ANSam-type. The local ANSam signal 307 thus comprises a 2100-Hz signal amplitude-modulated by a 15-Hz signal. Further, a second summing junction 301 then subtracts the local ANSam signal 307 from the scaled answer signal 50, thus forming a second error signal e1(k), reference number 311.

A first phase tracker 209 adaptively adjusts the phase of the local ANS signal 207 to follow the phase of the scaled answer signal 50. As shown, the first error signal e0(k) 211, which is essentially an error signal based on the difference between the scaled answer signal 50 and the local ANS signal 207 (where the difference is determined by subtracting the local ANS signal 207 from the scaled answer signal 50) is used to update the phase of the local ANS signal 207 via the first phase tracker 209.

Likewise, a second phase tracker 309 adaptively adjusts the phase of local ANSam signal 307 to follow the phase of the scaled answer signal 50. As shown, the second error signal e1(k) 311, which is essentially an error signal based on the difference between the scaled answer signal 50 and the local ANSam signal 307 (where the difference is determined by subtracting the local ANS signal 307 from the scaled answer signal 50), is used to update the phase of the local ANSam signal 307 via the second phase tracker 309.

A first error power accumulator 213 then forms, based on the first error signal e0(k) 211, a first distance d0(k), reference number 215, between the scaled answer signal 50 and the local ANS signal 207.

As well, a second error power accumulator 313 then forms, based on the second error signal e1(k) 311, a second distance d1(k), reference number 315, between the scaled answer signal 50 and the local ANSam signal 307.

Finally, after a predetermined period of time, a comparator 60 forms a result 70 based on comparing the two distances d0(k) and d1(k). Briefly, if the distance d0(k) 215 corresponding to the ANS local signal 207 is found to be shorter than the distance d1(k) corresponding to the ANSam local signal 307 (thus, d0(k)<d1(k), with the result 70 being negative), it is decided that the answer signal 10 contains an ANS signal. Otherwise, if the distance d1(k) 315 corresponding to the ANSam local signal 307 is found to be shorter than the distance d0(k) corresponding to the ANS local signal 207 (thus, d1(k)<d0(k), with the result 70 being positive), it is decided that the answer signal 10 contains an ANSam signal.

The detailed methods for the input-signal-amplitude estimation as performed by the amplitude estimator 20, the phase tracking algorithms as performed by the phase trackers 209 and 309, and the error power accumulation as performed by the error power accumulators 213 and 313 are given below.

The power estimation of the answer signal 10 as performed by the amplitude estimator 20 will now be discussed.

As is known, the conventional method of power estimation is to form the average of the squared signal samples. The problem with this approach, however, is that the noise power is also counted in the estimation. Thus, when the noise power is high, this approach can result in a large bias.

The method utilized herein is, first, to estimate the average signal shape and, second, to use this average signal shape to estimate the power. In the preferred embodiment, a sampling rate of 7200 Hz is used to sample the answer signal 10. This process is described in more detail below.

It is noted that, regardless of whether the ANS signal or the ANSam signal is received, the answer signal 10 will always contain a 2100 Hz component. Assuming that the ANSam signal is received, the 2100 Hz signal has a period of 24 samples, while the 15 Hz modulating signal has a period of 480 samples. In one period of 15 Hz signal, there are 20 periods of 2100 Hz signal.

The composite shape of a series of 24-samples thus reflects one period of a sine wave with slightly different amplitude, because of the effects of the 15 Hz amplitude modulation. Considering 20 periods of 24 samples, the k-th sample at the i-th period being denoted by $Si(k)$. An average over 20 of these 24-samples may be computed by $$Sa(k) = \frac{1}{20} \sum_{i=1}^{20} Si(k) \quad \text{Equation 1}$$

Then, an average shape $Sa(k)$ with averaged amplitude is obtained, thus reducing the noise power to 1/20 of its original value.

After the average shape is obtained, the signal power is calculated using the 24-samples via conventional average-of-squared-samples method. Thus, the squared value for each of the 24 samples is calculated, and then the average is determined to obtain the estimated power $E'$. This may be described as $$E' = \frac{1}{24} \sum_{k=1}^{24} Sa^2(k) \quad \text{Equation 2}$$

In the case of an ANS signal being received, the foregoing process may also be used to give an accurate power estimation.

Assuming the desired answer signal power is E, the level-adjust coefficient K may thus be calculated as $$K = \sqrt{\frac{E}{E'}} \quad \text{Equation 3}$$

The adaptive algorithms for phase tracking as performed by the first phase tracker 209 and the second phase tracker 309 will now be discussed.

The local ANS signal 207 has only one (1) phase P0, namely, the phase of the 2100 Hz component. In contrast, the local ANSam signal has a two (2) phases, namely, a first phase P1 of the 2100 Hz signal component and a second phase P2 of the 15 Hz modulating signal component.

In accordance with the present invention, the phase P0 of the local ANS signal 207 is adaptively adjusted according to the well-known adaptive least mean squares ("LMS") algorithm. Moreover, each of the two phases P1 and P2 of the local ANSam signal 307 are also adaptively adjusted according to the same adaptive LMS algorithm. In the phase updating process, the phase rotations caused by a 2100 Hz or a 15 Hz frequency under the preferred sampling rate of 7200 Hz are considered.

The process for adjusting the phase P0 of the local ANS signal 207 as performed by the phase tracker 209 will now be discussed.

For the phase of local ANS signal, the new phase is calculated as $$P0(k + 1) = P0(k) + \frac{7}{12}\pi \pm \Delta P0 \quad \text{Equation 4}$$

The P0(k), P1(k), P2(k), d0(k) values represent predetermined initial values for the signals indicated, i.e., prior to calculation of the new phase.

In the above Equation 4, $\Delta P0$ is the step size, which should be a small positive number. In one embodiment, for example, its value may be $\pi/200$. The sign before the $\Delta P0$ term of Equation 4 is determined by comparing the two (2) signs of the two (2) terms e0(k) and P0(k). If the two signs are the same, the negative sign is taken; otherwise, if they are different, the positive sign is taken.

The process for adjusting the phase P1 of the 2100 Hz component of the local ANSam signal 307 as performed by the phase tracker 309 will now be discussed. For the phase P1, the new phase is updated as $$P1(k + 1) = P1(k) + \frac{7}{12}\pi \pm \Delta P1 \quad \text{Equation 5}$$

In the above Equation 5, $\Delta P1$ is the step size, which should be a small positive number. In one embodiment, for example, its value may be $\pi/200$. The sign before the $\Delta P1$ term of Equation 5 is determined by the comparing the two (2) signs of the two (2) terms e1(k) and P1(k). If the two signs are the same, the negative sign is taken; otherwise, if they are different, the positive sign is taken.

The process for adjusting the phase P2 of the 15 Hz component of the local ANSam signal 307 as performed by the phase tracker 309 will now be discussed. For the phase P2, the new phase is updated as $$P2(k + 1) = P2(k) + \frac{\pi}{240} \pm \Delta P2 \quad \text{Equation 6}$$

In the above Equation 6, $\Delta P2$ is the step size, which should be a small positive number. In one embodiment, for example, its value may be $\pi/800$. The sign before the $\Delta P2$ term of Equation 6 is determined by determining the number of negative signs comprised by the three (3) terms e1(k), cos(P1(k)) and P2(k). If the number of negative signs is even (0 or 2), the negative sign is taken for the $\pi/800$ term; otherwise, if the number of negative sign is odd (1 or 3), the positive sign is taken.

The error power accumulation process as performed by the first error power accumulator 213 and the second error power accumulator 313 will now be discussed.

The distance d0(k) 215 between the scaled answer signal 50 and the local signal ANS 207 is calculated by the first error power accumulator 213. Likewise, the distance d1(k) 315 between the scaled answer signal 50 and the local signal ANSam 307 is calculated by the second error power accumulator 313. When each new pair of errors e0(k) and e1(k) are generated, the distances d0(k) and d1(k) are updated using a leaking-type recursive least squares algorithm. This is described as $$d0(k+1) = f\, d0(k) + (1-f)\, e0^2(k) \qquad \text{Equation 7}$$

$$d1(k+1) = f\, d1(k) + (1-f)\, e1^2(k) \qquad \text{Equation 8}$$

where f is the forgetting factor, the value of which should be near unity (1).

In summary, there is disclosed a detector 100 arranged for determining when an input signal 10 comprises a first signal, to wit, a 2100-Hz signal, and when the input signal comprises a second signal, to wit, a 2100-Hz signal that is amplitude-modulated by a 15-Hz signal. The detector comprises:

- an amplitude estimator 20 arranged for estimating the power of the input signal, thus calculating a scaling factor 30;
- a multiplier 40 arranged for scaling the input signal by the scaling factor, thus forming a scaled input signal 50;
- a first generator 205 arranged for generating a first local signal 207 based on the first signal;
- a second generator 305 arranged for generating a second local signal 307 based on the second signal;
- a first summing junction 201 arranged for forming a first error signal 211 based on the difference between the scaled input signal and the first local signal;
- a second summing junction 301 arranged for forming a second error signal 311 based on the difference between the scaled input signal and the second local signal;
- a first error power accumulator 213 arranged for forming a first distance 215 between the scaled input signal and the first local signal based on the first error signal;
- a second error power accumulator 313 arranged for forming a second distance 315 between the scaled input signal and the second local signal based on the second error signal; and,
- a comparator 60 arranged for determining when the input signal includes the first signal and when the input signal includes the second signal based on comparing the first distance and the second distance.

The detector further comprises:
- a first phase tracker 209 arranged for adjusting the phase of the first local signal to follow the phase of the scaled input signal based on the first error signal; and,
- a second phase tracker 309 arranged for adjusting the phase of the second local signal to follow the phase of the scaled input signal based on the second error signal.

Moreover, the first signal may be designated the "ANS signal" and the second signal may be designated the "ANSam signal."

Some advantages an adaptive coherent signal detection method and apparatus, in accordance with the present invention, as compared to the prior art notch-filter detector, are discussed below:

First, an adaptive coherent signal detection method and apparatus, in accordance with the present invention, provides an effective method to detect a v.id signal having a signal-to-noise ratio as low as 6 dB. In contrast, the notch filter detector of the prior art cannot function in this environment.

Second, due to its adaptive feature, an adaptive coherent signal detection method and apparatus, in accordance with the present invention, functions robustly even when a slow frequency shift is present in the received signal. In contrast, the notch filter detector of the prior art suffers a substantial performance loss in this environment.

While various embodiments of an adaptive coherent signal detection method and apparatus, in accordance with the present invention, have been described hereinabove, the scope of the invention is defined by the following claims.

What is claimed is:

1. A method for determining when an input signal comprises a first signal and when the input signal comprises a second signal, the method comprising the steps of:
   (a) scaling the input signal by a predetermined scaling factor, thus forming a scaled input signal;
   (b) generating a first local signal based on the first signal;
   (c) generating a second local signal based on the second signal;
   (d) forming a first error signal by subtraction of the first local signal from the scaled input signal;
   (e) forming a second error signal by subtraction of the second local signal from the scaled input signal;
   (f) forming a first distance between the scaled input signal and the first local signal based on the first error signal;
   (g) forming a second distance between the scaled input signal and the second local signal based on the second error signal; and,
   (h) determining when the input signal includes the first signal and when the input signal includes the second signal based on comparing the first distance and the second distance.

2. The method of claim 1, where the first signal includes a 2100 Hz component.

3. The method of claim 2, where the second signal includes a 2100 Hz component amplitude-modulated by a 15 Hz component.

4. The method of claim 3, where the determining step (h) includes a step of determining that the input signal includes the first signal when the first distance is less than the second distance.

5. The method of claim 4, where the determining step (h) includes a step of determining that the input signal includes the second signal when the second distance is less than the first distance.

6. The method of claim 5, including a step of forming the scaling factor based on an estimated power of the input signal.

7. The method of claim 6, where the scaling factor forming step includes a step of forming an estimated average input signal shape and a step of estimating the power based on the estimated average input signal shape.

8. The method of claim 3, where the first local signal includes a 2100 Hz component with a phase P0, and the first local signal generating step (b) includes a step (b1) of adjusting P0 to follow the phase of the scaled input signal.

9. The method of claim 8, where the P0 adjusting step (b1) is based on an adaptive least mean squares algorithm.

10. The method of claim 9, where the second local signal includes a 2100 Hz component with a first phase P1 and a 15 Hz component with a second phase P2, and the second local signal generating step (c) includes a step (c1) of adjusting P1 to follow the phase of the scaled input signal and a step (c2) of adjusting P2 to follow the phase of the scaled input signal.

11. The method of claim 10, where the P1 adjusting step (c1) and the P2 adjusting step (c2) are based on an adaptive least mean squares algorithm.

12. The method of claim 3, where the first distance forming step (f) includes a step of updating the first distance based on the square of the first error signal.

13. The method of claim 12, where the step of updating the first distance is based on a leaking-type recursive least squares algorithm.

14. The method of claim 13, where the second distance the second distance forming step (g) includes a step of updating the second distance based on the square of the second error signal.

15. The method of claim 14, where the step of updating the second distance is based on a leaking-type recursive least squares algorithm.

16. A detector arranged for determining when an input signal comprises a first signal and when the input signal comprises a second signal, the detector comprising:
   an amplitude estimator arranged for estimating the power of the input signal, thus calculating a predetermined scaling factor;
   a multiplier arranged for scaling the input signal by the scaling factor, thus forming a scaled input signal;
   a first generator arranged for generating a first local signal based on the first signal;
   a second generator arranged for generating a second local signal based on the second signal;
   a first summing junction arranged for forming a first error signal by subtraction of the first local signal from the scaled input signal;
   a second summing junction arranged for forming a second error signal by subtraction of the second local signal from the scaled input signal;
   a first error power accumulator arranged for forming a first distance between the scaled input signal and the first local signal based on the first error signal;
   a second error power accumulator arranged for forming a second distance between the scaled input signal and the second local signal based on the second error signal; and,
   a comparator arranged for determining when the input signal includes the first signal and when the input signal includes the second signal based on comparing the first distance and the second distance.

17. The detector of claim 16, further comprising:
   a first phase tracker arranged for adjusting the phase of the first local signal to follow the phase of the scaled input signal based on the first error signal; and,
   a second phase tracker arranged for adjusting the phase of the second local signal to follow the phase of the scaled input signal based on the second error signal.

18. The detector of claim 17, where the second signal is based on the first signal amplitude-modulated by a third signal.

19. The detector of claim 18, the first signal being a 2100 Hz signal.

20. The detector of claim 19, the third signal being a 15 Hz signal.

* * * * *